United States Patent [19]

Hachiro

[11] Patent Number: 4,538,503
[45] Date of Patent: Sep. 3, 1985

[54] VACUUM BOOSTER DIAPHRAGM MOUNTING

[75] Inventor: Nobuaki Hachiro, Ueda, Japan

[73] Assignee: Nissin Kogyo Kabushiki Kaisha, Ueda, Japan

[21] Appl. No.: 494,330

[22] Filed: May 13, 1983

[30] Foreign Application Priority Data

Aug. 5, 1982 [JP] Japan .................. 57-136474

[51] Int. Cl.$^3$ .............................................. F15B 9/10
[52] U.S. Cl. ........................ 91/376 R; 91/369 A; 91/422; 91/437; 92/169
[58] Field of Search ............ 91/49, 369 A, 422, 437, 91/376 R; 92/169.3, 169.2, 169.4, 98 D, 99

[56] References Cited

U.S. PATENT DOCUMENTS

| | | | |
|---|---|---|---|
| 3,921,501 | 11/1975 | Rosback | 91/422 |
| 4,286,501 | 9/1981 | Thomas et al. | 91/369 A |
| 4,292,887 | 10/1981 | Ohta et al. | 92/99 X |

FOREIGN PATENT DOCUMENTS

| | | | |
|---|---|---|---|
| 2061454A | 5/1981 | United Kingdom | 91/369 A |
| 2087496A | 5/1982 | United Kingdom | 92/169 B |
| 2089468A | 6/1982 | United Kingdom | 92/99 |

Primary Examiner—Sheldon J. Richter
Assistant Examiner—Randolph A. Smith
Attorney, Agent, or Firm—Armstrong, Nikaido, Marmelstein & Kubovcik

[57] ABSTRACT

A vacuum booster device which is mainly used to operate a master cylinder for hydraulic brakes or the like of automobiles. The device is so constructed that the inner peripheral bead of the diaphragm disposed within the booster shell and the clamping band adapted to clamp the bead tightly are fitted in the annular fitting groove formed in the rear surface of the booster piston, a part of the inner peripheral bead is formed as a thin-walled elastic valve portion which is in close-contact with the inner surface of the annular fitting groove in a separable manner and which engages with the notched recess formed in the rear side wall of the fitting groove, and the relief is provided between the valve portion and the clamping band to allow deformation of the elastic valve portion. Thus, when the pressure within the first working chamber is increased, air can be discharged from the first working chamber to the second working chamber through a gap made in the relief region due to deformation of the valve portion. This avoids an excessive rise in pressure within the first working chamber.

8 Claims, 3 Drawing Figures

VACUUM BOOSTER DIAPHRAGM MOUNTING

BACKGROUND OF THE INVENTION

1. Field of the Invention

This invention relates to a vacuum booster device which is mainly used to operate a master cylinder for hydraulic brakes, clutches or the like for automobiles by boosting negative pressure, and more particularly to a booster device of the type having: a booster shell; a booster piston housed in the booster shell to be movable forward and backward; a diaphragm which includes an inner peripheral bead fitted onto the rear surface of the booster piston, an outer peripheral bead fitted onto the peripheral wall of the booster shell and a pressure receiving portion superposed on the rear surface of the booster piston, and which is adapted to divide in cooperation with the booster piston the interior of the booster shell into a front-side first working chamber communicating with a vacuum source and a rear-side second working chamber; an input rod supported by the booster piston for advancing and retreating movements; and a controlling valve operatively connected with the input rod to selectively communicate the second working chamber with the first working chamber or the atmosphere.

2. Description of the Prior Art

In a vacuum booster device of the mentioned type, when the booster piston is manually operated to actuate the master cylinder in a state where the vacuum source is not operated, i.e., negative pressure is not stored in the first working chamber, air within the first working chamber is compressed due to advancing movement of the booster piston. Thus, advance of the booster piston is obstructed to some degree by virtue of resistance caused when the air is discharged to the vacuum source. As a result, the device tends to lose smoothness and lightness in its manual operation.

SUMMARY OF THE INVENTION

It is an object of this invention to provide an improved booster device of the above mentioned type which is operable in a simple and effective manner and is constructed such that when the booster piston is manually operated in a state where negative pressure is not stored in the first working chamber, the connecting portion between the inner peripheral bead of the diaphragm and the booster piston is prevented from disconnecting even with a rise in pressure within the first working chamber, and also air within the first working chamber is discharged to the second working chamber through a gap formed between the superposed surfaces of the diaphragm and the booster piston without suffering any obstruction from the presence of the connecting portion, so as to avoid an excessive rise in pressure within the first working chamber, thus permitting smooth and light manual operation of the booster piston.

To achieve the above object, according to the present invention, there is proposed a vacuum booster device of the type mentioned which is characterized in that the inner peripheral bead of the diaphragm and a clamping band adapted to clamp the inner peripheral bead are fitted in an annular fitting groove formed in the rear surface of the booster piston, a part of the inner peripheral bead is formed into a thin-walled elastic valve portion which is in close-contact with the inner surface of the annular fitting groove in a separable manner and which engages with a notched recess formed in the rear side wall of the fitting groove, and a relief is provided between the valve portion and the clamping band to allow deformation of the elastic valve portion.

DETAILED DESCRIPTION OF PREFERRED EMBODIMENT

Figure 1:
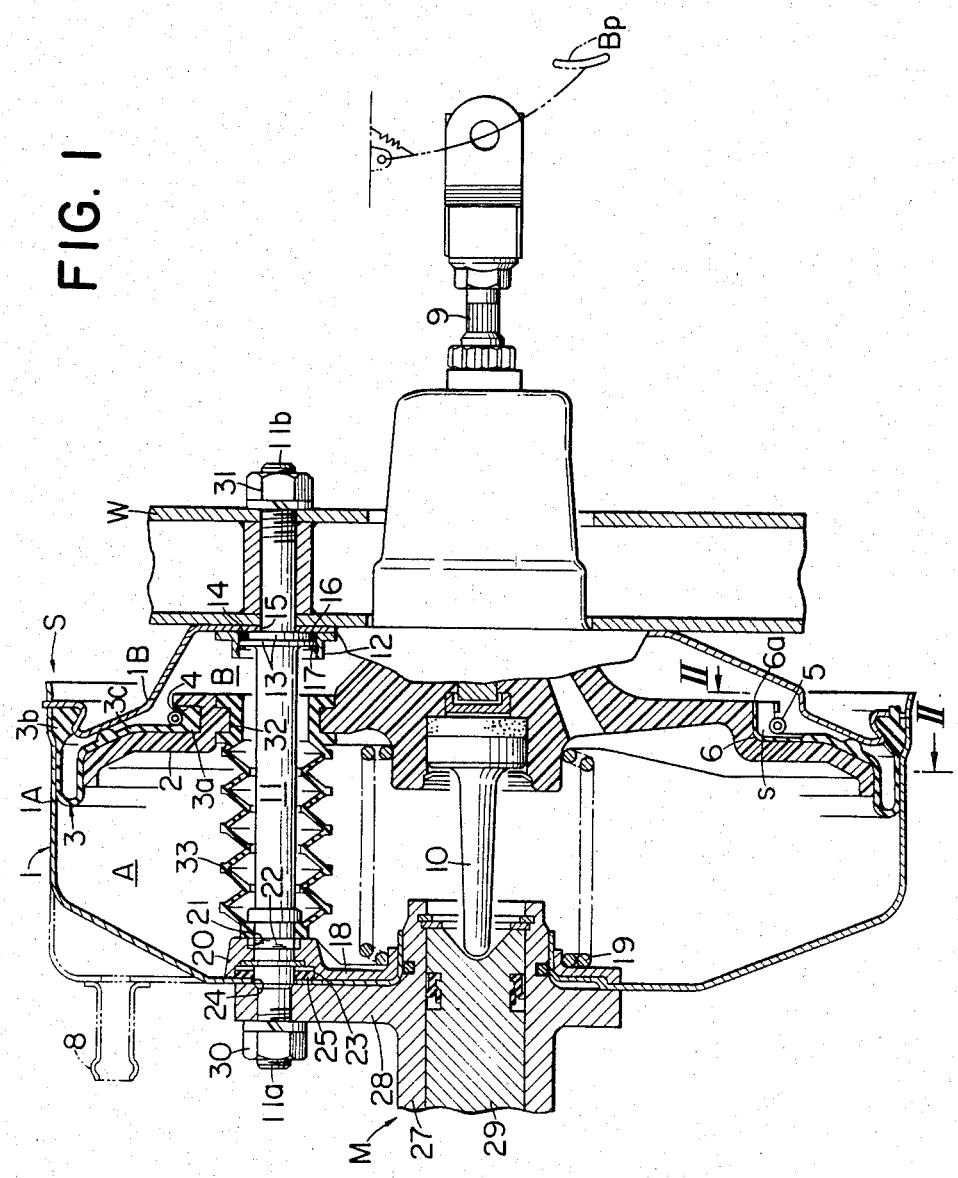
FIG. 1 is a longitudinal sectional side view showing one embodiment of a vacuum booster device according to this invention.

In the following, one preferred embodiment of this invention will be described with reference to the drawings. Referring to FIG. 1, designated at W is a support wall which constitutes the rear side wall of an engine room provided in automobiles. Attached to the front surface of the support wall is a vacuum booster device S of this invention, which has its front end port connected to a master cylinder M for the brake.

A booster shell 1 of the booster device S is composed of a front shell 1A and a rear shell 1B, which are formed separately from each other in the axial direction and which are made of a thin-walled steel plate or synthetic resin. The interior of the booster shell 1 is partitioned into a front-side first working chamber A and a rear-side second working chamber B by two members, i.e., a synthetic-resinous booster piston 2 housed in the booster shell 1 in a forwardly and backwardly movable manner as well as a rolling type diaphragm 3. The diaphragm 3 has an intermediate pressure receiving portion 3c superposed on the rear surface of the booster piston 2 and is integrally provided with beads 3a and 3b at the inner and outer peripheral portions, respectively. The inner peripheral bead 3a is fitted in a fitting groove 4 formed in the rear surface of the booster piston 2, while the outer peripheral bead 3b is disposed between the abutted end portions of both the front and rear shells 1A and 1B.

Furthermore, an endless clamping band 5 formed of a coil spring is also fitted in the fitting groove 4 so as to clamp the inner peripheral bead 3a from its outer periphery.

Figure 2:
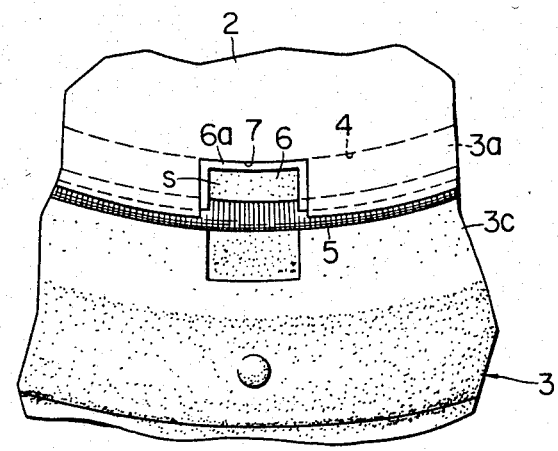
FIG. 2 is a sectional view taken along the line II—II in FIG. 1.
Figure 3:
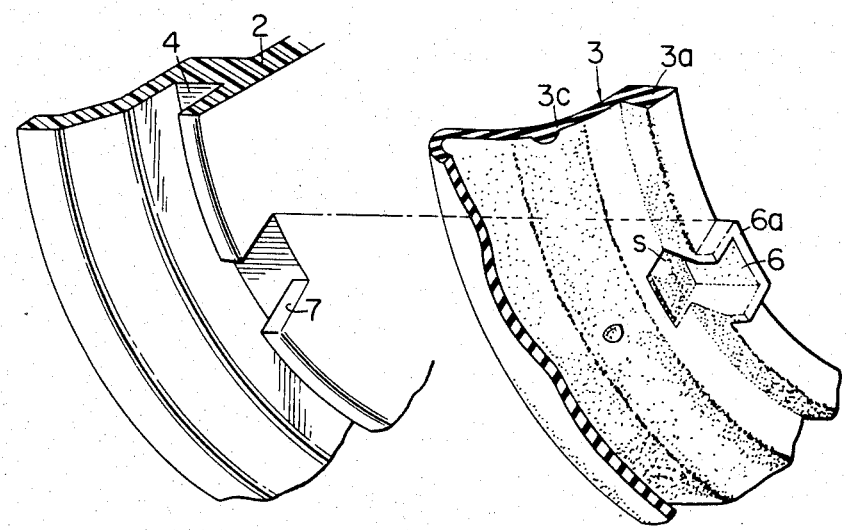
FIG. 3 is an exploded perspective view showing an essential part of FIG. 2.

As will be also apparent from FIGS. 2 and 3, a part of the inner peripheral bead 3a is formed into a thin-walled elastic valve portion 6. The valve portion 6 has a projected distal end 6a shaped into the form of U in cross section, such that it comes into close-contact with the inner surface of the fitting groove 4 in a separable manner and that it engages with a notched recess 7 formed in the rear wall of the fitting groove 4. This engagement of the distal end 6a with the notched recess 7 determines relative positions of the diaphragm 3 and the booster piston 2 about axes thereof. A relief s is provided between the valve portion 6 and the clamping band 5 to allow deformation of the valve portion 6.

The first working chamber A is always communicated through a vacuum inlet pipe 8 with the interior of an intake manifold (not shown) of an engine which serves as a vacuum source, while the second working chamber B is switched alternately in its communication with the first working chamber A or the atmosphere by means of a controlling valve (not shown) which is operated in accordance with advancing or retreating movement of an input member 9. Therefore, in a state where negative pressure is stored in the first working chamber A, when the input member 9 is advanced by actuating a brake pedal Bp so as to communicate the second working chamber B with the atmosphere, a propulsion force is applied to the booster piston 2 due to a pressure difference generated between both the working chambers A and B to advance the piston 2. Upon this advance of the booster piston 2, an operating piston 29 of the master cylinder M can be driven to move forward through an output member 10.

A pair of two tie rods 11 (only one is shown in FIG. 1) extend to penetrate through the respective end walls of both the front and rear shells 1A and 1B as well as the booster piston 2 in parallel with and at opposite positions about their common central axis.

A support tube 12 through which each of the tie rods 11 penetrates is welded to the inner end wall surface of the rear shell 1B, and a stepped flange 13 integrally projected from the outer periphery of the tie rod 11 is fitted into the support tube 12. A seal member 16 for sealing a tie rod through hole 15 formed in the rear shell 1B is fitted in an annular housing 14 which is defined by the stepped flange 13, the support tube 12 and the end wall of the rear shell 1B. A snap ring 17 is retained on the inner peripheral wall of the support tube 12 to hold the larger diameter portion of the stepped flange 13 in cooperation with the seal member 16. In this way, the tie rod 11 is rigidly fixed onto the end wall of the rear shell 1B.

On the other hand, superposed on the inner end wall surface of the front shell 1A is a clipping plate 18, for supporting the fixed end of a return spring 19 adapted to resiliently bias the booster piston 2 in the retreating direction. A pair of two bosses 20 are integrally formed at both ends of the clipping plate 18 and the pair of two tie rods 11 penetrate through these bosses 20, thereby to prevent rotation of the clipping plate 18. Also, each of bosses 20 is formed with a recessed hole 21 in the shape of a partially cut-out circle at the inner end surface thereof, and a flange 22 in the shape of a partially cut-out circle correspondingly formed on the tie rod 11 is fitted to the recessed hole 21, thereby to prevent rotation of the tie rod 11. Furthermore, each of bosses 20 is formed with a recessed seal housing 23 at the outer end surface thereof, and a seal member 25 for sealing a tie rod through hole 24 of the front shell 1A is fitted in the housing 23.

Both end portions of the tie rod 11 which project from the booster shell 1 forward and backward are formed as bolts 11a and 11b, respectively. The front bolt 11a extends to penetrate through a mounting flange 28 which is formed at the rear end of a cylinder body 27 of the master cylinder M, and a nut 30 is screwed onto the distal end of the bolt 11a. With this, the master cylinder M is mounted to the front surface of the booster shell 1 through the tie rods 11, and at the same time it holds and reinforces the end wall of the front shell 1A in cooperation with the clipping plate 18. In this manner, the front and rear shells 1A and 1B are joined with each other integrally through the tie rods 11.

Meanwhile, the rear bolt 11b extends to penetrate through the support wall W and has a nut 31 screwed onto the distal end thereof, whereby the booster shell 11 is rigidly fixed to the support wall W through the tie rods 11.

Each of the tie rods 11 is surrounded by a bellowslike flexible boot 33 in the first working chamber A. The front end of the boot 33 is closely fitted over the outer periphery of the tie rod 11, whereas the rear end thereof is closely fitted in a through hole 32 of the booster piston 2, through which the tie rod 11 penetrates. Therefore, the flexible boot 33 can seal the through hole 32 due to its flexibility without obstructing the forward and backward movement of the booster piston 2.

In the above-mentioned construction, when high negative pressure is stored in the first working chamber A, this negative pressure causes a large attraction force acting on the end wall of the front shell 1A, which has particularly low rigidity. Even in that state, however, since such attraction force is transmitted through the clipping plate 18 and the tie rods 11 to the support wall W and born thereby, and also since the end wall of the front shell 1A is held between the clipping plate 18 and the mounting flange 28 of the master cylinder M to be reinforced, there will occur no inward deformation. Further, since the clipping plate 18 supports the fixed end of the return spring 19, a resilient force of the return spring 19 is also transmitted to the tie rod 11 and hence is not born by the front shell 1A.

When the input member 9 is moved forward by actuating the brake pedal Bp to advance the booster piston 2, the operating piston 29 of the master cylinder M is pushed forward through the output member 10 so as to generate oil pressure within an oil pressure chamber (not shown), whereby the wheel brake is applied. At this time, a forward pushing force of the operating piston 29 acts as a forward thrust load on the cylinder body 27 of the master cylinder M through the generated oil pressure, but this load is transmitted through the mounting flange 28 and the tie rods 11 to the support wall W and born thereby. Therefore, such a load will not be born by the booster shell 1 and deformation of the booster shell 1 due to the load may be prevented.

Next, in the state where negative pressure is not present in the vacuum source and hence negative pressure is not stored in the first working chamber, when the input member 9 is moved forward to advance the booster piston 2 manually, the second working chamber B is disconnected from communication with the first working chamber A and is placed in communication with the atmosphere through the not shown control valve, so that the air within the first working chamber A is compressed and is about to discharge into the side of the vacuum source via the vacuum inlet pipe 8. But, when the pressure within the chamber A is raised up and exceeds a predetermined level due to discharge resistance produced at that time, this increased pressure separates the superposed portions of the rear surface of the booster piston 2 and the pressure receiving portion 3c of the diaphragm 3 and makes a gap therebetween. The pressure further allows the thin-walled elastic valve portion 6 to deform toward the side of the relief s. With this, the air within the first working chamber A is discharged into the second working chamber B under the atmospheric pressure through gaps produced between the valve portion 6 and the fitting groove 4 as well as the notched recess 7. As a result, it becomes possible to avoid an excessive pressure rise within the first working chamber A, whereby manual operation of the booster piston 2 can be performed smoothly and lightly.

On the other hand, when the booster piston 2 is retreated, the pressure within the first working chamber A becomes lower than that within the second working chamber B, whereupon the pressure receiving portion 3c of the diaphragm 3 is brought into close-contact with the rear surface of the booster piston 2.

According to the present invention, as has been described above, since the inner peripheral bead 3a of the diaphragm 3 and the clamping band 5 adapted to tightly clamp the inner peripheral bead 3a are fitted in the annular fitting groove 4 formed in the rear surface of the booster piston 2, the diaphragm 3 is connected to the booster piston 2 positively. Thus, when the booster piston 2 is manually operated with the first working chamber A being under no negative pressure, and hence when the pressure within the first working chamber A is increased, it is possible to positively prevent the inner peripheral bead 3a of the diaphragm 3 from slipping out of the fitting groove 4 in the booster piston 2.

Furthermore, a part of the inner peripheral bead 3a is placed in close-contact with the inner surface of the fitting groove 4 in a separable manner and is formed as the thin-walled elastic valve portion 6 engaged with the notched recess 7 which is formed in the rear side wall of the fitting groove 4, and the relief s allowing the valve portion 6 to deform is provided between the valve portion 6 and the clamping band 5 in order that when the booster piston 2 is manually operated, the valve portion 6 deforms in the region of the relief s due to the increased pressure within the first working chamber A to make a gap between the booster piston 2 and the valve portion 6. With this arrangement, air can be discharged from the first working chamber A to the second working chamber B through the gap thereby to prevent an excessive pressure rise within the second working chamber B. Thus, the booster piston 2 can be manually operated smoothly and lightly. Also, since a part of the inner peripheral bead 3a constitutes the valve portion 6, it is not required to provide an exhaust valve additionally. In addition, the valve portion 6 has a function of positioning the diaphragm 3 with respect to the booster piston 2 in cooperation with the notched recess 7. Consequently, a special positioning means is not necessary and the construction is simplified so much.

What is claimed is:

1. In an improved vacuum booster device comprising; a booster shell; a booster piston housed in said booster shell in a forwardly and backwardly movable manner; a diaphragm including an inner peripheral bead tilted onto a rear surface of said booster piston, an outer peripheral bead fitted onto the peripheral wall of said booster shell and a pressure receiving portion superposed on the surface of said booster piston, said diaphragm being adapted to divide the interior of said booster shell into a front-side first working chamber communicating with a vacuum source and a rear-side second working chamber in cooperation with said booster piston; an input rod supported by said booster piston for advancing and retracting movements; and a control valve operably connected with said input rod to selectively communicate said second working chamber with said first working chamber or the atmosphere, the improvement wherein said inner peripheral bead of said diaphragm is tightly fitted in an annular fitting groove formed in the rear surface of said booster piston with the aid of a clamping force given by a clamping band mounted to said inner peripheral bead; said inner peripheral bead having a bottom surface fitted to a bottom portion of said fitting groove, a side surface fitted to a rear side wall of the groove and an upper surface located opposite to said bottom surface receiving said clamping band, a part of said inner peripheral bead being formed as a recessed portion having a thin-walled side wall portion in close contact but separably with the rear surface of said booster piston and a thin-walled bottom wall portion in close contact but separably with the bottom portion of said fitting groove, said thin-walled side wall portion of the recessed portion being recessed from a side on which said recessed portion faces said clamping band so as to have a thickness smaller than that of the pressure receiving portion of said diaphragm, said recessed portion engaging with a notched recess formed in the rear side wall of said fitting groove; wherein said recessed portion constitutes a thin-walled elastic valve portion which is normally in close-contact with the rear surface of the booster piston and the bottom portion of said fitting groove and which is deformable as required to provide communication between said first and second working chambers through said valve portion free from engagement with said clamping band.

2. A vacuum booster device according to claim 1, wherein said elastic valve portion has a distal end portion shaped into the form of U in cross section for engagement with said notched recess.

3. A vacuum booster device according to claim 1, wherein a plurality of tie rods for connecting between the front and rear walls of said booster shell extend through said front and rear walls as well as said booster piston, an air-tight means allowing said booster piston to move forward and backward is provided between said booster piston and each of said tie rods, and said annular fitting groove is disposed to surround all of said tie rods.

4. A vacuum booster device according to claim 3, wherein said air-tight means is composed of a flexible boot which surrounds each of said tie rods in said first working chamber and which has both ends connected to said tie rod and said booster piston, respectively.

5. A vacuum booster device according to claim 1, wherein said upper surface of said inner peripheral bead is inclined downwardly toward a side opposite to the side where said side surface is disposed.

6. A vacuum booster device according to claim 5, wherein said elastic valve portion has a distal end portion shaped into the form of U in cross section for engagement with said notched recess, said distal end portion being formed on said side surface of the inner peripheral bead.

7. A vacuum booster device according to claim 1, wherein a substantial portion of said clamping band is positioned in a radially inner side than the radially outermost edge of the rear side wall of the fitting groove in the mounted position thereof.

8. A vacuum booster device according to claim 1, wherein said clamping band is made of an endless coil spring.

* * * * *